INVENTORS.
William A. McGrew
William G. Edwards

INVENTORS.
William A. McGrew
William G. Edwards
BY
*McGrew & Edwards*
ATTORNEYS

United States Patent Office 3,331,207
Patented July 18, 1967

3,331,207
METHOD AND SYSTEM FOR COLLECTING
AND DISTRIBUTING WATER
William A. McGrew, 5040 E. 1st Ave., Denver, Colo.
80220, and William G. Edwards, 5701 E. Piedmont
Drive, Englewood, Colo. 80110
Filed Dec. 26, 1963, Ser. No. 333,316
23 Claims. (Cl. 61—1)

This invention relates to the collection and distribution of the water content of atmospheric precipitation into natural collection and use areas. More specifically, this invention relates to a controlled method and means of collecting and distributing natural precipitation into retention areas where the collected and recovered moisture is retained and released later for the use or benefit of inhabitants of the collection or drainage area.

In the United States and many other populated areas, there is presently an adequate or substantially adequate water supply for the entire population, but the increasing growth in population, increasing industrial and domestic demand on available water supplies, and irregularities in availability of water throughout the year or other period of time, indicate that areas of sufficiency today may be areas of deficiency tomorrow.

The requirements for additional water supplies may be solved in several ways. In the first place, the seas adjoining land areas afford what amounts to an unlimited supply of water requiring costly processing to convert it to a form which will be useful to mankind. A second source of supply for beneficial use of collected waters is to reduce evaporation and to increase precipitation in collection or retention areas. A third possibility resides in increasing collection and controlling distribution of collected water. Finally, there is the possibility of reuse of contaminated or waste water discharge of industrial or municipal systems.

One of the present proposals for reuse of contaminated or waste waters involves a dual distribution system; one part of which delivers essentially pure and clean water fit for internal use, such as through residential and other domestic taps or outlets, and a second and separated part which delivers impure or reused water for other domestic uses, such as irrigation, waste disposal and the like. Such a system involves dual supply lines and dual distribution lines. Obviously, when such a system is to be established in an occupied area, the cost of installing the added facilities for such a system, including right-of-way, operational controls, such as valves and pumping facilities, increased distribution lines, and the service and maintenance of such components places an extremely high cost on the additional water so obtained.

Sea water sources provide an almost unlimited volume of water, and to a lesser extent, inland lakes and other bodies of brackish waters provide a huge supply, but the cost of treatment and distribution to places of large volume use makes such water extremely costly and impractical under the present economy. Attempts have been made to reduce evaporation losses as by providing a chemical film on the surface of storage reservoirs, protective coatings on snow or ice deposits, and similar practices, but the additional water so obtained has not been shown to justify the costs except for very small stock ponds and tanks.

Another proposal for increasing water supplies involves increasing the precipitation of natural moisture by cloud seeding. The benefits of such practices are still disputed but available evidence indicates that in certain areas natural precipitation can be increased by at least a small amount when cloud formations and atmospheric conditions are right, but the additional water that can be recovered by such methods is uncertain, and the cost of obtaining such water is hard to evaluate.

The practice of the present invention represents a departure from prior methods in collecting, increasing and distributing water supplies. It utilizes modified natural collection or drainage areas and the ambient temperatures of the area in which it is installed, coupled with certain advantages in terrain, soil, vegetation and prevailing storm conditions. One of the innovations of the practice is the retention of natural and supplemental waters of collection and drainage areas while at essentially freezing temperatures and formed as a spray or mist directed into air at lower temperatures so as to congeal and deposit the collected water as ice formations which effectively lessen evaporation losses and delay run-off in thawing periods and release of water so as to become available to downstream users during periods of greatest demand.

In particular, this invention has its greatest utility in semi-arid or arid regions having relatively long, low temperature winters, or similar locales in which the gathered or recovered water is utilized near the site of its collection, or is delivered by gravity flow to places of use.

Accordingly, it is an object of our invention to provide a simple, economical and efficient method of gathering, storing and releasing natural moisture in amounts exceeding the quantity available under the usual natural conditions.

Another object of our invention is to provide a simple, economical and efficient gathering system for precipitated atmospheric moisture which provides long period storage under low temperature and evaporation conditions, and provides selective release and distribution in thawing periods.

A further object of our invention is to provide a simple, economical and efficient method for establishing and maintaining precipitated atmospheric moisture continuously at below freezing temperatures over long periods of time.

Yet another object of our invention is to provide a novel and inexpensive circulatory system including components shielded against clogging and freezing thereby providing efficient starting and stopping at prevailing low temperatures.

The practice of our invention may utilize a variety of circuiting systems, all of which perform the basic or essential procedures to attain the desired results, but may vary substantially in operating procedures and controls of the operation of the circuit. The accompanying drawings illustrate typical installations and such installations will be described with reference to the drawings hereinafter.

The practice of the invention contemplates certain essential procedures which are necessary in attaining the desired results. Among these is the provision for withdrawing water from a stream or other source of supply in a watershed, such as natural or artificial ponds, lakes, springs and the like, from which water flows throughout at least a substantial portion of the year. The water so withdrawn is frozen or congealed within a short period of time, utilizing natural conditions in doing so and the withdrawn water is distributed over a selected area of substantial extent, preferably in a rather uniform distribution so as to induce a progressive development of an ice formation which in a seasonal operation will build up to a considerable thickness or depth over the treatment area and thereby presents a relatively small evaporation surface in relation to the total water content of the formation.

Another feature involves the initial preparation for water distribution. Prior to or about the time that nighttime freezing occurs regularly in the treatment area, the ground surface of the treatment area will be thoroughly wetted as by flooding, spraying or the like to induce as much moisture penetration as possible for the character of the soil on which the water is directed. Nighttime freezing will induce frost penetration and by having sufficient water available on or near the surface during the low temperature periods, the frost condition can be propagated. Whenever water and daytime ambient temperature is high enough to cause melting or thawing in the wetted formation, water input is terminated until temperature conditions are suitable for additional freezing. Consequently, by the time the prevailing temperature conditions are satisfactory for substantial freezing, the base of the treatment area is maintained at a subfreezing temperature, thus preventing loss of water from the overlying ice mass. Any melt water produced during the build-up which is not recovered at the surface will be absorbed by the soil and recharges the underlying ground water reservoir.

In many locations, as for example, adjoining the head waters of streams in the Colorado mountains, the altitude of the valley floor may be on the order of 10,000 feet above sea level. At such elevations, the low temperature conditions required in the practice of the present invention may extend for a period of as much as 200 days. During a considerable part of said period, extremely low nighttime temperatures will prevail and sub-zero daytime temperatures, while infrequent, occur with fair regularity. Even when daytime temperatures go as high as 40° or 50° F. during the winter season, the total number of hours per day of above freezing temperature will be few and a major portion of the 24 hour period will be substantially below freezing temperature and suited for ice formation.

The practice of our invention contemplates the operation of the water distribution in relation to temperature conditions and care is exercised not to apply water in any substantial quantity to previously frozen surfaces when solar heating inuput and air temperature would be high enough to induce thawing, even when the water applied might be only a few degrees above freezing temperature. In this way, run-off and evaporation losses are held to a negligible degree.

The practice of our invention also provides for collection and retention of substantially the entire water content of precipitated atmospheric moisture distributed over the treatment area. In the gathering season, snowfall usually occurs in low temperature periods, but even when it is accompanied by above freezing temperatures, the above freezing interval will be of short duration and all or substantially all of the water is converted to ice and retained in the deposited ice formation.

When lower ambient temperatures permit, the snow is wetted as it falls and deposits on the formation. In preferred practice this is done by spraying water withdrawn from the source of supply into the falling snow and onto the fallen snow in sufficient quantity and for a long enough interval to form ice. Any crusted snow which is not wetted sufficiently to form ice in the first water application is wetted repeatedly by subsequent applications until it is finally congealed as solid ice.

By continuing such water distribution and atmospheric moisture retention on as near a continuous basis as temperatures will permit over a gathering season on the order of 200 days, it will be apparent that a considerable quantity of water is collected and retained in the treatment area and substantially in excess of the quantity that could be retained by natural conditions. The practice of our invention also contemplates the use of cloud seeding near the treatment area during storm periods and also when cloud formation and atmospheric conditions indicate that precipitation can be induced, and this provides an additional source of water input to the treatment area that otherwise would not be available.

Natural and induced snowfall occurring during periods of higher ambient temperature also may be subjected to wetting by the spraying action, particularly when the withdrawn water is at a temperature near 32° F. Such spraying or wetting is extended over the treatment area in a progressive pattern with only a limited amount of water deposited at any given point, and the heat exchange between the ice base on which water falls, the deposited water, and circulating air produces ice formation within a short interval.

The practice of our invention may utilize a variety of preparation procedures with different systems or arrangements of equipment providing the collection, build-up, retention and final distribution of the available water. Before describing typical systems and equipment, a typical operation will be described. As such an operation requires a number of working personnel on regular duty during the entire operating season, heated housing and protection for workmen and equipment, and maintenance of operating equipment under long periods of low temperature, much of which will be nighttime operation, adequate power facilities must be provided where such facilities are not available at the operating location.

In this example, the high altitude treatment area extends for several miles along the valley floor, located for the most part in areas which are substantially shaded during daytime hours through the winter months. Preliminary preparation will include drainage courses at predetermined intervals and selected locations which will insure regulated gravity return flow to the steam flowing along the valley floor. Preferably, such courses will be dammed at the stream end until continuous thawing and run-off occurs so as to prevent drainage away from the treatment area during periods of ice formation.

In addition, timber removal and land leveling may be provided where required so as to reduce or retard gravitational movement of deposited moisture. Roads or trails also will be provided as required for movement of equipment adjacent the treatment area. Usually, it will be desirable to deepen the stream bed at intervals to provide basins of substantial depth from which the water is withdrawn for ice formation.

In this operation, relatively high pressure lines are used which are covered with suitable heat insulating materials so as to prevent clogging due to ice formation when operating during low temperature periods. Such lines include an intake line having its intake in one of said basins in the stream and which delivers water into the intake end of a pump, and a discharge line from the pump feeding a spray distributor, such as a rotary spray. Water is pumped from the basin and distributed over a treatment area in rather uniform amounts to wet the surface of such area as soon as ambient temperatures approach freezing temperature. This distribution is continuous until the soil is soaked, after which the spray unit is moved to an adjoining treatment area which is wet in the same way. By the time the prevailing temperatures are low enough to induce frost penetration of the soil, the entire treatment area along the valley floor is so prepared.

Thereafter, water distribution is regulated to temperature so as to avoid melting of frozen areas and this procedure continues until the soil base is frozen to a substantial depth, as for example, from three to six feet. After the entire base is so prepared, surface ice formation begins. During and after soil freezing begins, precipitated moisture will be collected and retained. This may include cloud seeding to induce increased precipitation when cloud formations indicate possibilities for induced precipitation.

To this end, silver iodide generators will be located at suitable locations in the approximate vicinity of the treatment area for operation in accordance with observed conditions. Ambient temperatures are recorded or observed on a regular or continuous schedule. When snow falls, the sprays will be operated, and the extent of the wetting of falling and deposited snow will be regulated in accordance with temperature. When the temperature relationship of base and ambient temperature will produce fast freezing, falling and deposited snow is substantially wetted, whereas if excessive spraying is calculated to cause melting, the water input will be reduced until freezing temperatures develop. If the initial spraying of deposited snow results only in crusting, subsequent spraying for ice build-up will wet the crusted snow until it becomes fully congealed. Consequently, substantially the entire moisture content of the deposited snow is retained in the treatment area.

Ice build-up is undertaken on as nearly a continuous basis as possible so as to utilize favorable existing temperatures to produce the maximum ice formation. The low temperature base functions as one heat exchange media, the atmosphere another and the water supply also assists, as stream temperatures at the withdrawal point generally are only a few degrees above 32° F. and during cold periods sometimes are less than 32° F. Therefore, if the fine drops of water do not congeal during the time they are in the air after discharge by the spray nozzle, they congeal rapidly after deposit on the low temperature surface on which they fall.

If a rotary spray pattern is used, it is preferable to regulate the spray pattern so that a greater volume of water is discharged near the periphery of the pattern and a lesser volume near the center so as to form an elevated rim or dished effect inducing gravitational movement of water toward the center. Any melting produced by a temporary excess of water is not detrimental as such water will congeal long before it can reach any point of escape.

After a substantial ice mass is formed on the frozen soil base, more water may be applied in a given treatment interval as available surface heat exchange is more pronounced and the congealing effect is accelerated. The resulting increase in ice formation has the effect of protecting most of the total ice content from melting by solar heating or action of wind movements so that little evaporation occurs during the cold period when ice formation continues, particularly in relation to the total water content.

At the end of the cold period when continuous thawing begins, the air action and solar heating, while softening exposed surfaces, do not penetrate the ice formation to any substantial degree, and as heat exchange continues, the melting rate will be much slower than crusted snow subjected to the same conditions. Consequently, the collected winter snowfall on the slopes and in other areas adjoining the ice formation melts rapidly, producing the usual run-off conditions in the valley stream, whereas the ice formation melts at a slow rate producing only a limited amount of water delivery into the stream during the run-off period. Following the early run-off, the longer days, increasing exposure to sun and higher ambient temperatures produce more intensified melting of the ice formation, which with lessening heat exchange action provides a substantial discharge flow to the stream, which reaches the downstream users in periods of greatest need, namely, the hot summer months.

If more delay in melting of the ice formation is required, shade may be provided to lessen the solar energy input, or the surface may be covered with strips or layers of insulation material so as to lessen heat exchange by atmospheric air contact and also to lessen melting by exposure to the sun. Also, if brush and timber clearing has been employed, the top of the ice formation may be covered by branches and similar shading as ice buildup terminates.

The accompanying drawings illustrate typical procedures and mechanisms utilized in the practice of our invention. To afford a better understanding of our invention, certain representative procedures will be described with reference to said drawings. In the drawings, in the several views of which like parts bear corresponding reference numerals.

Figure 1:
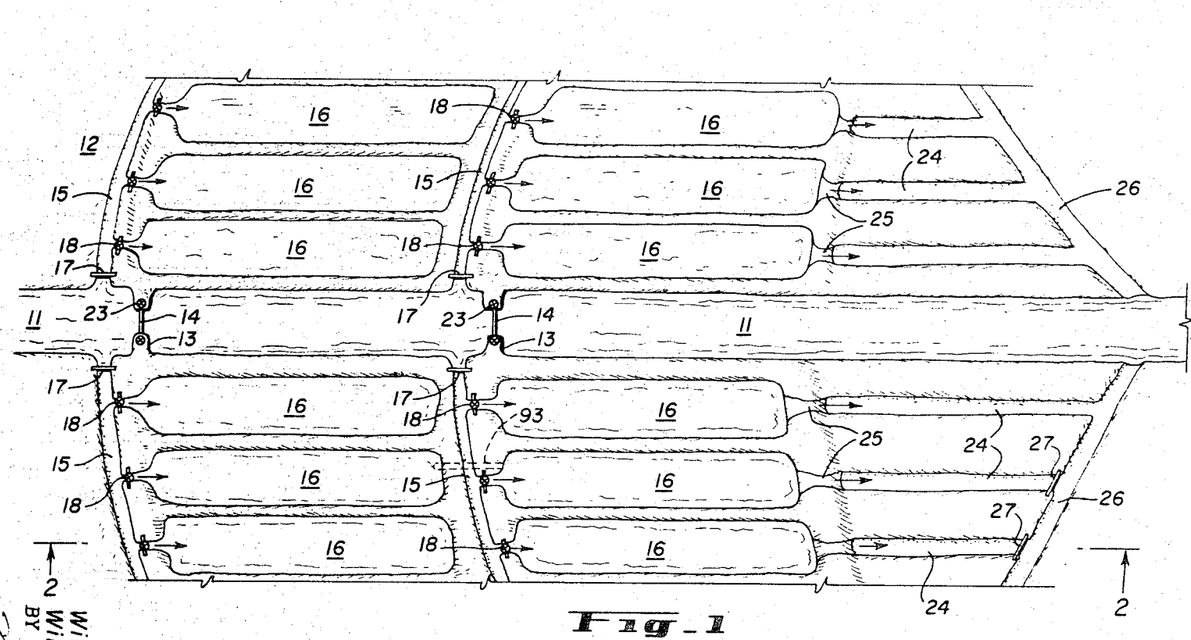
FIG. 1 is a schematic top plan view or flow sheet showing one arrangement of a treatment area utilizing features of our invention.

Referring first to FIG. 1, a treatment and collection area is depicted in which gravity flow is utilized for the input and removal of water from the supply source. As shown, a stream 11 flowing along a valley floor 12 in a high altitude, low temperature valley has a succession of dams 13 provided with adjustable gates 14, to selectively direct overflow from the stream along lateral courses 15. Adjoining the stream 11, a series of basins 16 are disposed laterally of the direction of flow. These basins are elongated in the direction of flow of the stream and are selectively wetted by flow from the stream 11 by opening or closing gates 17 bordering dams 13 to direct flow down a given course 15, and other valves or gates 18 deliver the water into a selected basin 16.

These controls permit a flow to be diverted from the stream 11 into a selected course 15 from which it is again diverted through an opening of one or a plurality of the gates or valves 18 into selected basins 16. After a desired amount of flow is introduced into a given basin 16, flow to that basin is stopped until the contents of the basin are frozen. During the period of base formation, sufficient water is directed into each basin to substantially saturate the soil forming its bottom so as to cause freezing and frost penetration which ultimately provides a frozen base of substantial depth. After the base is frozen to a substantial depth and ambient temperatures are reduced to permit freezing of low temperature water during a substantial part of each day, smaller amounts of water are delivered into each basin to induce faster freezing, and all basins are filled with approximately the same amount of water in each filling cycle.

This distribution proceeds progressively throughout the entire treatment area, and by the time the distribution has progressed through the entire series of basins, and is ready to begin on a repetitive sequence, the first basin the sequence will have deposited water congealed on and in the low temperature base so that the next water input will congeal as a layer above the previously deposited layer of the ice formation. In this way the ice build-up is progressive over the entire treatment area.

Figure 2:
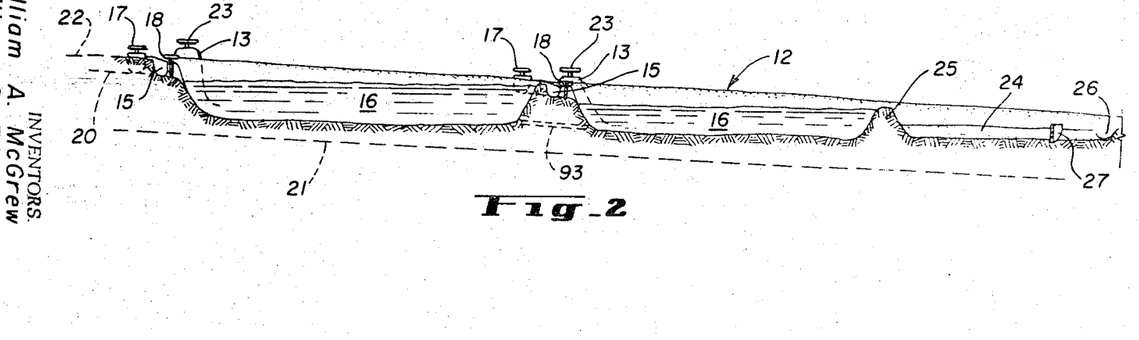
FIG. 2 is a sectional view, taken along the line 2—2, FIG. 1.

As shown in FIG. 2, the dash line 20 represents the normal base level of stream 11, the dash line 21 represents the depth of frost penetration, and the dash line 22 represents the surface level position of stream flow upstream of a given dam 13 occasioned by setting of a gate 14 to arrest or retard stream flow. Actuation of the gate 14 is provided by a screw mechanism 23 to vary the effective overflow level in the central portion of a given dam 13. The valves 17 and 18 preferably are the gate type.

The downstream end of the treatment area shown in FIGS. 1 and 2 has a series of gathering ditches 24, the upstream ends of which are dammed as shown at 25. The ditches 24 discharge into return flow ditches 26 which extend downstream far enough to permit gravity return at a point above normal stream level. The dams shown at 25 may be of any suitable character including an earth fill which is easily removed after freezing ends and thawing occurs. Also, if it is desired to control input into return ditches 26, gates 27 as shown in FIG. 2 may be provided.

Actually, overflow or flooding in this area is not a troublesome problem during the thaw period as most of the flow is directed toward the stream and seepage or evaporation losses due to flooding will only involve a very minor part of the total discharge from basins 16. However, an all gravity system as shown and described is not as effective as a pumping and spraying system due to the time lag in water distribution and the difficulty of obtaining substantially uniform distribution without excessive wetting and melting of frozen material or deposited snow.

Figure 3:
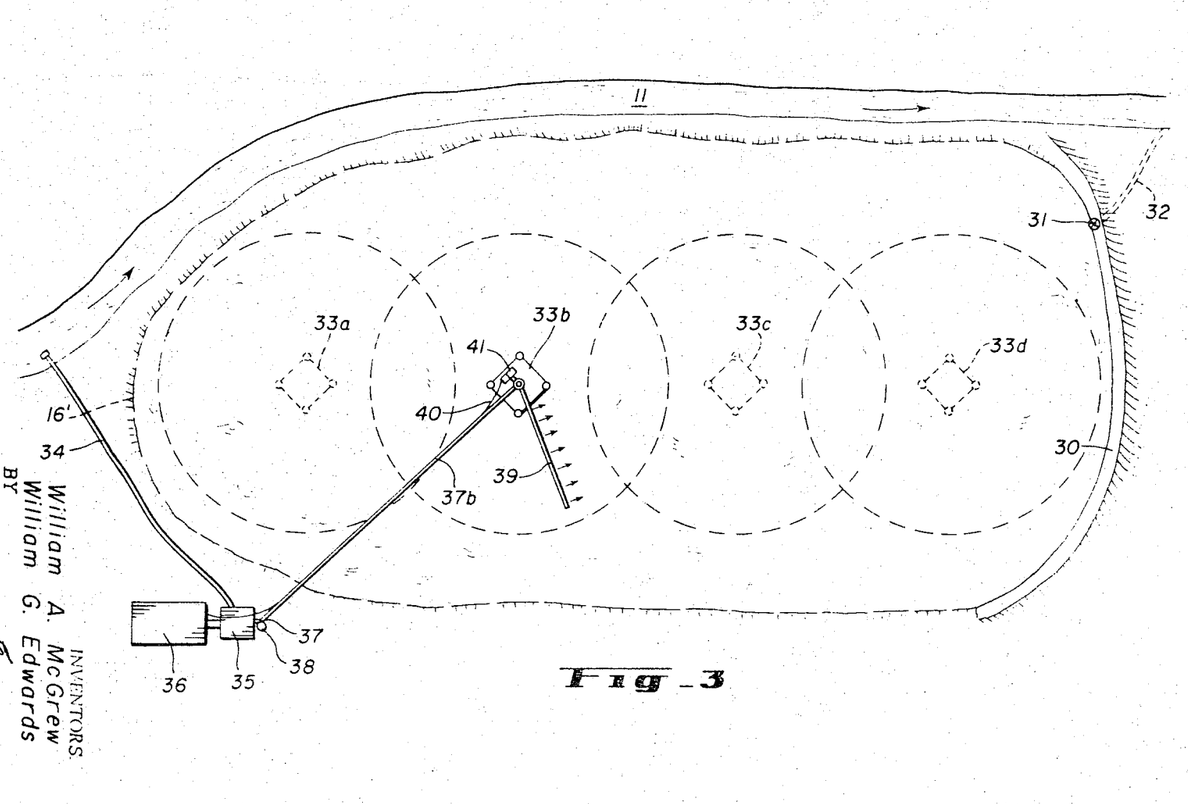
FIG. 3 is a schematic top plan view or flow sheet of another arrangement of treatment area utilizing practices of our invention.

FIG. 3 illustrates another type of treatment area utilizing features of our invention. As shown, the treatment areas comprises a single prepared basin 16' located adjacent a stream 11. The floor of the basin declines from its upstream end to its downstream end, and a dam 30 at the downstream end of substantial height prevents flow from the basin until an outlet valve 31 is opened to permit discharge through a conduit or passage 32 and into stream 11.

Figure 8:
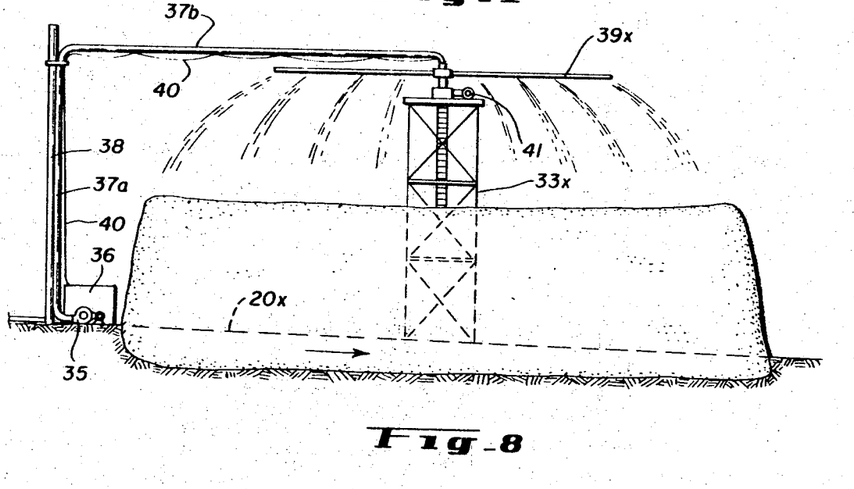
FIG. 8 is a side elevation illustrating a spray unit for use in the practice of our invention which permits progressive increase in elevation of the spray unit during periods of ice buildup.

A tower structure is utilized for the support of the water distribution components of this arrangement. FIG. 8 shows details of such a tower structure and will be described in conjunction with the description of treatment depicted in FIG. 3. In the initial preparation operation, base sections of towers will be located at positions 33a, 33b, 33c and 33d so as to permit wetting of substantially all of the bottom of basin 16' in the formation of a frozen base. At this stage of preparation, operating components mounted on the towers may be moved from tower to tower as required, although in the latter operating procedure it will be more advantageous to have components on each tower and for that reason it is preferable to have separate installations at the beginning of the operation.

As shown in FIG. 3, water is withdrawn from stream 11 through a line 34 by a pump 35 driven by a prime mover 36. The pump discharge is directed through a line 37 having an upright portion 37a (FIG. 8) supported from a pole 38, and an overhead discharge portion 37b delivers elevated water into a rotary spray unit 39 which distributes the water discharge as a fine spray or mist over substantially the entire width of the treatment area. A wiring connection 40 from a generator (not shown) associated with prime mover 36 is carried by portions 37a and 37b and provides the power supply to a motor and speed reducer unit 41 on the tower structure. When not disposed in an overhead position, portion 37b and the associated portion of wire 40 will be shielded to prevent ice formation thereon during spray discharge.

Referring now to FIG. 8, the tower structure 33x is essentially the same as the towers 33a, 33b, 33c and 33d of FIG. 3, and comprises sectional demountable scaffolding of the type used in building construction. At the beginning of an operating season, a single section is secured in the frozen base 20x, and its top deck provides the support for the operating components of the installation. As the ice build-up progresses, additional sections are added to raise the top deck elevation and provide the desired spacing of the spray unit from the surface of the ice formation so as to permit maximum spread of the spray.

It will be understood that FIG. 8 is a representative side elevation of tower 33b and associated components shown in FIG. 3 except for the different type of spray head utilized. The spray unit 39x shown in FIG. 8 comprises two outboard sections or tubular arms which preferably have fine spray discharges at intervals along their length, and an end discharge directing sprays a substantial distance beyond the ends of the arms. By proper control of the volume of such discharges a greater ice build-up will result adjacent the periphery of the spray pattern than in the central portion thereof. In this way, any excessive deposit of water will be retained on the ice formation until congealed.

Again referring to FIG. 3, the arrangement shown has the advantage of providing a close control of the return discharge after thawing begins, and a substantial part of the collected water may be retained in the basin area for later return to the stream whenever delayed discharge is desirable. When the ultimate point of use is at a lower elevation where stored water has a substantially higher evaporation rate, the water stored in the gathering area may be held under low evaporation conditions until just before the period of critical need at the lower point of use.

It is contemplated that most of the installations using the features of this invention will be located along streams or other supply sources subject ot water appropriation laws and regulations. Water withdrawal rights willl have to be acquired for the gathering system if they are not otherwise available, but most of the water withdrawn will be in periods when most of the flow is not being taken for downstream usage, and such upstream withdrawal insures the availability of more water for priority users in periods of maximum withdrawal demand.

Figure 4:
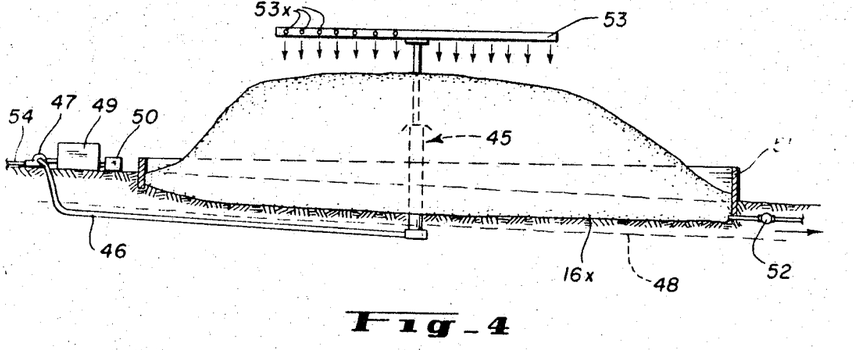
FIG. 4 is a side elevation of still another type of treatment area utilized in the practice of our invention.

FIG. 4 illustrates another type of spray mounting which may be provided in a single gathering basin, or as a multiple spray installation in a basin of the type shown in FIG. 3. In this arrangement, a telescoping column 45 is permanently installed in a basin 16x which may be of considerable depth, if desired. A heat insulated conduit 46 extends underground from a pump 47 at a depth substantially below frost level 48 and connects to the base of column 45, which preferably is insulated to prevent any freezing of its contents. Although not shown, supply lines of a hydraulic drive and elevating system will adjoin conduit 46 to control the operations of column 45. A prime mover 49 drives pump 47 and circulates the hydraulic fluid from a reservoir or tank 50. If desired, basin 16x may have a wall enclosure 51 to prevent overflow and assist water distribution in the ice formation operations. A valve-controlled outlet 52 returns collected water to the supply source after thawing begins.

During build-up, a rotary overhead spray unit 53 is operated whenever temperature conditions permit, or when snow is falling. Pump 47 draws water from the stream or other supply through an intake condition 54 and discharges through supply conduit 46 into column 45. Water under pumping pressure is elevated through column 45 and discharges into spray unit 53 for distribution through its multiple nozzles 53x as a fine spray. The hydraulic system rotates unit 53 at slow speed and provides the telescopic extension as required. At the completion of a spraying operation, the entire distribution system can be cleared of water to prevent freezing of passages in the manner set forth in the following description.

Figure 6:
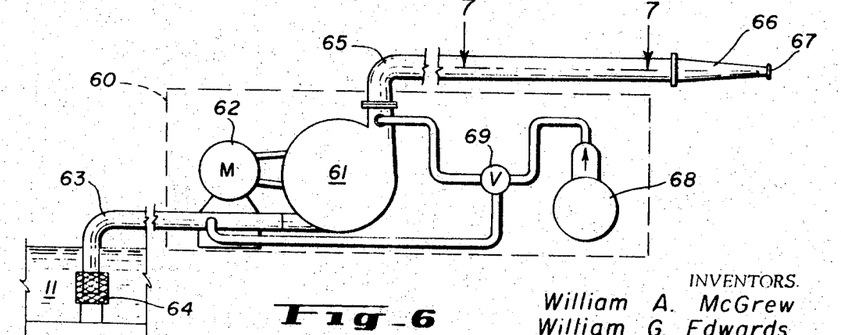
FIG. 6 is a schematic side elevation of the arrangement of essential equipment utilized in the practice of our invention, and showing control means utilized in preventing freezing of equipment during operation in very low temperature periods.

FIG. 6 shows an arrangement of essential components of a water distribution system combined with a water cleanout installation. Such an installation may be utilized with any of the spray systems shown and described herein. This assembly preferably is enclosed in a suitable building as represented by dash lines 60, and is located in proximity of the stream 11 or other source of water supply. A pump 61 driven by a motor 62 has an intake line 63 extending into stream 11 and preferably the intake end of line 63 is supported in a screen or trash guard 64.

A discharge line 65 conducts the pump discharge to a nozzle 66 or any suitable type of spray unit having at least one restricted discharge outlet 67 to form the fine spray or mist effect previously described. A steam boiler 68 has conduit connections with discharge line 65 and intake line 63, preferably controlled by a three way valve 69, which permits a steam blast to be directed into intake line 63 as the motor 62 is shut off, followed by a second setting for directing a steam blast into line 65 only, or while discharging through line 63 until the pump is fully stopped, after which the valve is moved to the shut-off position.

The high temperature steam discharge under pressure, sweeps all contained water from the distribution system, and also may be utilized to clear the intake opening, if frozen, at the time a new operation begins. Also, when incorporated in a distribution system such as shown in FIGS. 3, 4 and 8, steam can be selectively directed through the spray units before pumping resumes so as to assist spray rotation and insure that all passages are open for operation.

Figure 5:
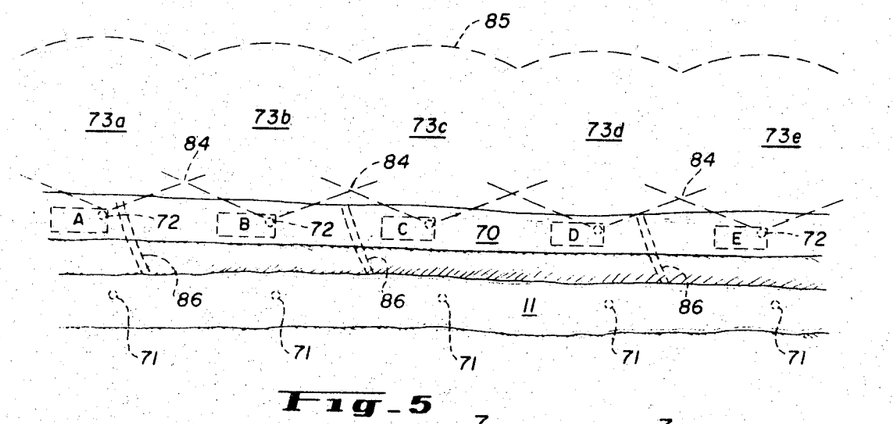
FIG. 5 is another schematic top plan view or flow sheet of still another arrangement of treatment area utilizing other features of our invention.
Figure 9:
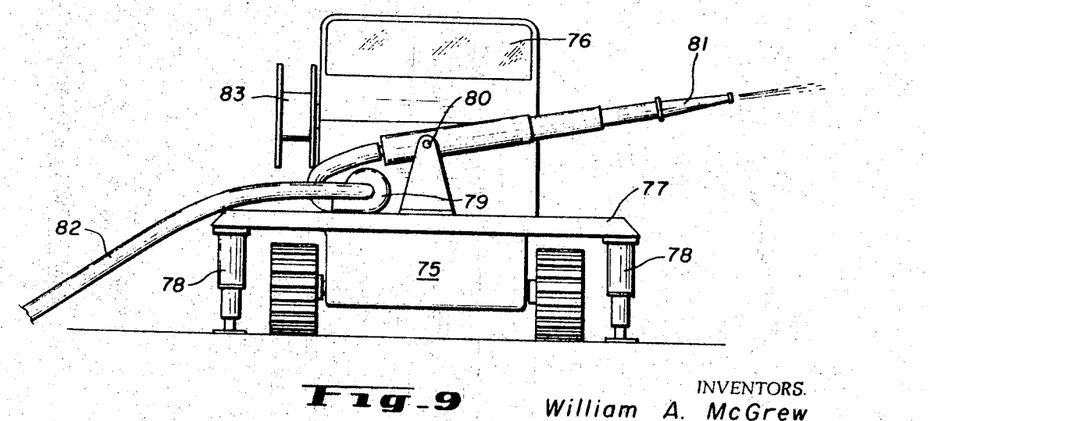
FIG. 9 is a front elevation of another portable type of spray unit utilized in the practice of our invention.

Still another type of distribution system is illustrated in FIG. 5, preferably utilizing mechanism of the type shown in FIG. 9. A trail or roadway 70 extends along the stream 11 for a substantial distance and has operation stations or platforms A, B, C, D and E which preferably provide uniform lengthwise spacing. A self-propelled vehicle, preferably of the endless track type, carries all the distribution components during travel and operates at a succession of stations before initiating a repetition of such sequential treatments.

The roadway 70 is located in rather close proximity to the stream and only a short stretch of conduit or hose is required to draw water from the intake position 71 to the pump position 72. Such conduit may be carried on a reel during transport by the vehicle and is drawn off the reel and inserted in the stream at the operating station. The spray is directed in an oscillating arcuate pattern over sections of the treatment area 73a, 73b and 73c, for example, adjacent stations A, B and C.

A typical mechanism utilized in the practice depicted in FIG. 5 is shown in FIG. 9 and comprises a crawler type vehicle 75 having an operator's cab 76 enclosing the control panel and driving components. The vehicle has outboard structure 77 carrying hydraulic jacks 78 which are moved into ground-contacting position to provide stabilized support for the vehicle at an operating station. The power unit of the vehicle, in addition to providing the usual propulsion and operation of the hydraulic system also operates a pump 79 discharging into a pivoted boom 80 of a nozzle member 81, which boom preferably is of the telescoping type permitting substantial extension during operating intervals. The boom is pivoted for vertical and horizontal swinging movement so that the elevation of the nozzle may be changed and the spray directed over an arcuate area. The intake line 82 which extends into the stream during operation is supported on a reel 83 when the vehicle is moved.

The location of the stations shown in FIG. 5 permits the lapping pattern of water distribution to be employed as indicated by the dash lines 84. Arcuate dash lines 85 represent the outer limits of the water distribution. Ditches or channels 86 are loosely filled during the ice formation period and are opened when thawing begins to return water to stream 11.

Figure 7:
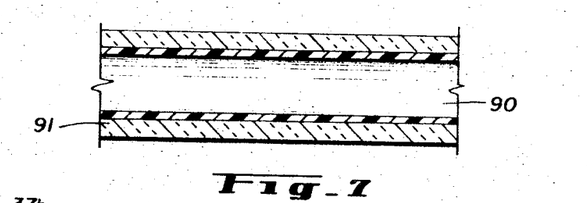
FIG. 7 is a fragmentary vertical section through a portion of a conduit used in the water distribution system of our invention.

While any suitable type of compositions may be used as conduits and as insulation for the conduits, we prefer to use the arrangement shown in FIG. 7. The sectional view has been related to the line 7—7, FIG. 6, and the assembly includes an inner pipe or conduit portion 90 of a suitable plastic composition, preferably pliable when cold, covered by a thick layer of heat insulating material 91 which may be stiff or relatively rigid when it functions as a structural member or may be flexible or pliable when bending is required.

With further reference to the collection arrangement shown in FIGS. 1 and 2 it will be understood that the basins will be relatively long and the treatment area will be located where the valley floor has a substantial slope. Consequently, the ground level elevation at the upstream end of the area will be substantially higher than the ground level at the downstream end of the area and the same is true of the stream level. Because of this, the lower end of the basin may be many feet below the ditch level supplying such basin and still provide gravity drainage to the return courses.

As indicated by the dash line 93 in FIG. 2, an upper basin 16 may have a conduit connection permitting drainage of water from the upper basin to the lower with final water removal from the lower basin through one of the courses 24 previously described. It will be understood that in the all gravity operation after substantial melting occurs, it will be necessary to drain the lower basin 16 while retaining the water in the alined upper basin until there is a substantial super-elevation therein, at which time the conduit 93 can be opened to discharge water from the upper basin to the lower basin and establish a common level.

However, in some locations it may be preferable to have the elevation of the lower end of the respective basins substantially below the bottom of the stream and this will result in ultimate collection of water at a level below stream level requiring other than a gravity flow for its removal. Even in such circumstance, most of the entire amount of collected water can be discharged by gravity flow and the excess water below stream level can be pumped into the discharge courses for ultimate delivery to the stream.

It will be understood that most installations will have the treatment area located between the bank of a stream and the rising slope of the adjoining mountain or hillside. In preferred practice, such slope will be a north slope providing shade for the treatment area throughout much of the collection period. In such locations a substantial amount of snowfall occurs which produces considerable run-off when the area warms sufficiently to produce continuous melting of the deposited snow. As a consequence, the treatment area functions as a retention basin for the run-off water from the adjoining slopes and until substantial melting of the formed ice has occurred, some of the run-off water may be frozen by heat exchange with the formed ice, thus further delaying its delivery into the stream. Such a condition is desirable as excessive run-off frequently causes flooding in the lower valley and the increased flow at the lower elevations frequently provides more water than can be taken under the appropriation priorities.

The discharge arrangements described hereinbefore provide a control of flow of run-off water as well as the melted water of the basin into the watershed drainage, and the total effect of such control is to provide substantially more water downstream in periods of critical need than otherwise would be available. Where the rate of melting is fast enough that flooding would result without substantial flow out of the treatment area, it will be necessary to regulate the rate of discharge from the area so that flooding is avoided. However, in most instances the return flow rate can be restricted during the period of maximum run-off in the adjoining areas of the stream so that the main output from the treatment area will occur after the streams have resumed near normal flow.

Referring to the arrangement shown in FIGS. 3 and 5, it will be understood that the ice formation procedure does not require ice build-up over the entire treatment area although it is preferable to freeze the entire area unless operating difficulties are occasioned thereby. In the deposit patterns shown in FIGS. 3 and 5, there are areas not wetted to any substantial extent by the spraying operation and where the ice build-up continues for a long time, the top of the ice formation may reach as much as 30 to 50 feet above the base level. Therefor, when the thawing begins and melting occurs at a rapid rate the run-off water will level itself throughout the treatment area around the remaining ice and previously unfilled areas will be filled by this action. This has the effect of providing excess space to accommodate run-off water entering the area and is a factor in providing for the delayed discharge of return flow previously described. Particularly in the arrangement shown in FIG. 3 where the dam 30 is intended to retain a substantial amount of water for a considerable period after melting begins, the ultimate discharge can be closely controlled in relation to stream level and also with respect to the water demand of downstream users.

It will be understood that in all the areas shown it will be preferably to have the base of the ice formation above the normal stream level, but when the nature of the soil and other conditions of the area permit, the base of the treatment area may be located substantially below stream level. The same pumping facilities used to provide the ice formation, particularly the pump intake and discharge lines, may be reversed to effect discharge of the collected water from the portions of the area below stream level.

In all the spraying operations previously described, it will be desirable to have as nearly uniform water distribution over the entire area as possible so that the top surface of the ice formation will be substantially horizontal and without substantial protuberances. As a consequence, the total exposed surface is substantially less than when an irregular surface is formed and this reduces the evaporation losses.

Another feature of the practice of this invention as set forth in the preceding description is its utilization as a means of recharging an underlying ground water reservoir. At the present time, the ground water supply varies in accordance with precipitation in the area and the amount of withdrawal to the surface by water users. Some recharging of ground water supplies occurs in irrigated areas where seepage from ditches and the like provides a return, but in general irrigation is not operated with reference to the ground water supply.

As previously mentioned, the retention area of the present invention may have a lower bottom level than the adjoining stream level and under such circumstances gravity flow to the stream can be provided only by very long ditches or by pumping as previously described. Where recharging of ground water reservoirs is desired, the retention basins may have normally closed, flow-conducting courses such as drilled holes which are normally capped and after the discharge of collected water has met the total requirement of the downstream users, the discharge flow to the stream may be shut off and the recharge courses opened to discharge the remaining water in the retention area to an underlying ground reservoir.

In addition, the entire collection operation may be utilized to provide ground water recharge in which case the discharge courses to the stream would not be utilized and a discharge arrangement to provide higher capacity delivery to the ground water reservoir would be substituted. As the arrangement for such return is obvious from the preceding description, no attempt has been made to illustrate such discharge in the accompanying drawings.

Also, because of difficulty in illustration with relation to the scale of the drawings, no attempt has been made to show certain of the control features utilized in the practice of our invention. As noted in the preceding description, after the initial preparation of the treatment area begins, the operation is on as near a continuous basis as conditions will permit. The critical factors include the air or ambient temperature and the temperature of the water at the point of withdrawal; the ambient temperature should be sufficiently low to facilitate freezing of the water and should therefore be 32° F. or lower. Continuous temperature measurements may be taken with a recording thermometer or determined by observation on a regular or frequent sampling schedule.

Where cloud seeding is practiced, observation of cloud formations will be made and weather reports received to determine opportune times for starting cloud seeding generators. Also, as the discharge flow is closely related to downstream need and demand, regular reports will be received after thawing begins to determine the discharge requirements as to time and volume. In some instances, automatic control of operation may be provided particularly with an installation of the type shown in FIG. 4, and if desired, the operation of pump 47 may be initiated and stopped by an electric circuit responsive to recorded temperatures.

The drawings are intended to illustrate typical arrangements of apparatus utilized in the practice of the invention and typical systems and methods for attaining the desired results. Changes and modifications may be availed of within the spirit and scope of the invention as set forth in the hereunto appended claims.

We claim:

1. The method for increasing water content and modifying flow in natural watersheds and basins, which comprises wetting a large surface storage area with water from an adjoining source of water supply to establish by sufficiently low ambient temperatures a base having a subsurface frost depth on the order of several feet, withdrawing water from the supply source during periods when ambient temperatures are about 32° F. or lower, distributing the withdrawn water progressively over the frozen storage area in small increments so as to induce an ice build-up over substantially the entire storage area, wetting with water from said supply falling and fallen snow of the treatment area whenever ambient and base temperatures will congeal the wetted snow into additional ice build-up, continuing such build-up progressively throughout the low temperature season until general thawing occurs, and releasing water of the thawing ice build-up into the supply source.

2. The method for increasing water content and modifying flow in natural watersheds and basins, which comprises wetting a large surface storage area with water from an adjoining source of water supply to establish by sufficiently low ambient temperatures a base having a subsurface frost depth on the order of several feet, withdrawing water from the supply source during periods when ambient temperatures are lower than 32° F., distributing the withdrawn water progressively over the frozen storage area in small increments and in approximately uniform quantities so as to induce an ice build-up over substantially the entire storage area, wetting with water from said supply falling and fallen snow of the treatment area whenever ambient and base temperatures will congeal the wetted snow into additional ice build-up continuing such build-up progressively throughout the low temperature season until general thawing occurs, and releasing water of the thawing ice build-up into a water course supplying downstream users.

3. The method for increasing water content and modifying flow in natural watersheds and basins, which comprises wetting a large surface storage area with water from an adjoining source of water supply to establish by sufficiently low ambient temperatures a base having a subsurface frost depth on the order of several feet, withdrawing water from the supply source during periods when ambient temperatures are about 32° F. or lower, distributing the withdrawn water progressively over the frozen storage area as an elevated spray in small increments so as to induce an ice build-up over substantially the entire storage area, wetting with water from said supply falling and fallen snow of the treatment area whenever ambient and base temperatures will congeal the wetted snow into additional ice build-up, continuing such build-up progressively throughout the low temperature season until general thawing occurs, and releasing water of the thawing ice build-up into the supply source.

4. The method for increasing water content and modifying flow in natural watersheds and basins, which comprises wetting a large surface storage area with water from an adjoining source of water supply to establish by sufficiently low ambient temperatures a base having sub-surface frost depth on the order of several feet, withdrawing water from the supply source during periods when ambient temperatures are about 32° F. or lower, distributing the withdrawn water progressively over the frozen storage area as an elevated spray in small increments so as to induce an ice buildup over substantially the entire storage area, spraying water from said supply into falling and fallen snow of the treatment area whenever ambient and base temperatures will congeal the wetted snow into additional ice build-up, continuing such buildup progressively throughout the low temperature season until general thawing occurs, and releasing water of the thawing ice build-up into the supply source.

5. The method for increasing water content and modifying flow in natural watersheds and basins, which comprises wetting a large surface storage area with water from an adjoining source of water supply to establish by sufficiently low ambient temperatures a base having a sub-surface frost depth on the order of several feet, withdrawing water from the supply source during periods when ambient temperatures are about 32° F. or lower, distributing the withdrawn water progressively over the frozen storage area in small increments so as to induce an ice buildup over substantially the entire storage area, wetting with water from said supply falling and fallen snow of the treatment area whenever ambient and base temperatures will congeal the wetted snow into additional ice build-up, continuing such build-up progressively throughout the low temperature season until general thawing occurs, and releasing water of the thawing ice build-up into a water course supplying downstream users after general run-off has terminated.

6. The method for increasing water content and modifying flow in natural watersheds and basins, which comprises wetting a large surface storage area with water from an adjoining source of water supply to establish by sufficiently low ambient temperatures a base having a sub-surface frost depth on the order of several feet, withdrawing water from the supply source during periods when ambient temperatures are about 32° F., spraying the withdrawn water progressively over the frozen storage area in approximately uniform quantities so as to induce an ice build-up over substantially the entire storage area, spraying with water from said supply falling and fallen snow of the treatment area whenever ambient and base temperatures will congeal the wetted snow into additional ice build-up, continuing such build-up progressively throughout the low temperature season until general thawing occurs, and releasing water of the thawing ice build-up through flow-confining courses at intervals along the melting ice to points of discharge into the supply source.

7. The method for increasing water content and modifying flow in natural watersheds and basins, which comprises wetting a large surface storage area bordering a mountainside with water from an adjoining source of supply to establish by sufficiently low ambient temperatures a base having a sub-surface frost depth on the order of several feet, withdrawing water from the supply source during periods when ambient temperatures are about 32° F. or lower, distributing the withdrawn water progressively over the frozen storage area in small increment so as to induce an ice build-up over substantially the entire storage area, wetting with water from said supply falling and fallen snow of the treatment area whenever ambient and base temperatures will congeal the wetted snow into additional ice build-up, continuing such build-up progressively throughout the low temperature season until general thawing occurs, collecting run-off water from the mountainside in the treatment area when thawing occurs, congealing some of the collected run-off water by maintaining it in contact with the formed ice build-up therein, and releasing water in the storage area to downstream users after general run-off has terminated.

8. The method for increasing water content and modifying flow in natural watersheds and basins, which comprises wetting a large surface storage area bordering a mountainside with water from an adjoining source of water supply to establish by sufficiently low ambient temperatures a base having a sub-surface frost depth on the order of several feet, withdrawing water from the supply source during periods when ambient temperatures are about 32° F. or lower, distributing the withdrawn water progressively over the frozen storage area in small increments so as to induce an ice build-up over substantially the entire storage area, wetting with water from said supply falling and fallen snow of the treatment area whenever ambient and base temperatures will congeal the wetted snow into additional ice build-up, continuing such build-up progressively throughout the low temperature season until general thawing occurs, collecting run-off water from the mountainside in the treatment area when thawing occurs, congealing some of the collected run-off water by maintaining it in contact with the formed ice build-up therein, and releasing water in the storage area to the supply source in a volume regulated to the flow confining capacity of the source at its point of return.

9. The method for increasing water content and modifying flow in natural watersheds and basins, which comprises wetting a large surface storage area bordering a mountainside with water from an adjoining, flowing source of water supply to establish by sufficiently low ambient temperatures a base having a sub-surface frost depth on the order of several feet, withdrawing water from the supply source during periods when ambient temperatures are about 32° F. or lower, distributing the withdrawn water progressively over the frozen storage area in small increments so as to induce an ice build-up over substantially the entire storage area, wetting with water from said supply falling and fallen snow of the treatment area whenever ambient and base temperatures will congeal the wetted snow into additional ice build-up, continuing such build-up progressively throughout the low temperatures season until general thawing occurs, collecting run-off water from the mountainside when thawing occurs, retaining released run-off water in the storage area during progression of ice melting, and returning retained water from the storage area to the supply source at time intervals determined by the flow requirements of downstream users.

10. The method for increasing water content and modifying flow in natural watersheds and basins, which comprises wetting a large surface storage area bordering a mountainside with water from an adjoining source of water supply to establish by sufficiently low ambient temperatures a base having a sub-surface frost depth on the order of several feet, withdrawing water from the supply source during periods when ambient temperatures are about 32° F. or lower, distributing the withdrawn water progressively over the frozen storage area in small increments so as to induce an ice build-up over the entire storage area, wetting with water from said supply falling and fallen snow of the treatment area whenever ambient and base temperatures will congeal the wetted snow into additional ice build-up, continuing such build-up progressively throughout the low temperature season until general thawing occurs, collecting run-off water from the mountainside when thawing occurs, retaining released run-off water in the storage area during progression of ice melting, and releasing retained water from the storage area to an accessible flowing stream in a volume determined by the flow requirements of downstream users.

11. The method for increasing water content and modifying flow in natural watersheds and basins, which comprises wetting a large surface storage area with water from an adjoining source of water supply to establish by sufficiently low ambient temperatures a base having a sub-surface frost depth on the order of several feet, withdrawing water from the supply source during periods when ambient temperatures are about 32° F. or lower, distributing the withdrawn water progressively over the frozen storage area in small increments so as to induce an ice build-up over substantially the entire storage area, wetting with water from said supply falling and fallen snow of the treatment area whenever ambient and base temperatures will congeal the wetted snow into additional ice build-up, continuing such build-up progressively throughout the low temperature season until general thawing occurs, shielding the formed ice build-up therein from solar heating and air movements when general thawing begins to thereby delay thawing, and releasing water of the thawing in the storage area into an adjoining water course for downstream use.

12. A system for increasing water content and modifying flow in natural watersheds and basins, comprising an elongated, water-retention area formed in a low temperature location bordering a mountainside and an extensive supply of water and being at least partially shaded by said mountainside during the winter months, means including conduits for withdrawing low temperature water from the supply source and for directing it to induce wetting of substantially the entire surface of the retention area as regular freezing begins so as to propagate frost penetration of the soil base of the area to a depth of several feet, means for initiating repeated wetting of fallen and falling snow in the frozen area with water from the supply source delivered by said conduit means when ambient temperatures will cause congealing of water, whereby ice build-up over the area is continued progressively through a low temperature season, said area being arranged to collect and retain run-off water from the mountainside when general thawing begins, and flow directing means operable to deliver collected water from the retention area to the supply after substantial collection and retention of water released by thawing therein.

13. A system for increasing water content and modifying flow in natural watersheds and basins, comprising an elongated, water-retention area formed in a low temperature location bordering a mountainside and an extensive supply of water and being at least partially shaded by said mountainside during the winter months, means including conduits for withdrawing low temperature water from the supply source and for directing it in a fine spray to induce wetting of substantially the entire surface of the retention area as regular freezing begins so as to propagate frost penetration of the soil base of the area to a depth of several feet, means for initiating repeated wetting of fallen and falling snow in the frozen area with water from the supply source delivered by said conduit means when ambient temperatures will cause congealing of water in the fine spray, whereby ice build-up over the area is continued progressively through a low temperature season, said area being arranged to collect and retain run-off water from the mountainside when general thawing begins, and flow directing means operable to deliver collected water from the retention area to the supply after substantial collection of water released by thawing.

14. A system for increasing water content and modifying flow in natural watersheds and basins, comprising an elongated, water-retention area formed in a low temperature location bordering a mountainside and an extensive supply of water and being at least partially shaded by said mountainside during the winter months, means including conduits for withdrawing low temperature water from the supply source and for directing it in gravity flow to induce wetting of substantially the entire surface of the retention area as regular freezing begins so as to propagate frost penetration of the soil base of the area to a depth of several feet, means for initiating repeated wetting of fallen and falling snow in the frozen area with water from the supply source delivered by said conduit means when ambient temperatures will cause congealing of water therein, whereby ice build-up over the area is continued progressively through a low temperature season, said area being arranged to collect and retain run-off water from the mountainside when general thawing begins, and flow directing means operable to deliver collected water from the retention area to the supply in gravity flow after substantial collection and retention of water released by thawing therein.

15. In a system for increasing water content and modifying flow in natural watersheds and basins, including a pump having intake means for insertion in a source of water supply, and having discharge means including a spray nozzle for distributing water over a treatment area, a source of steam supply connected to the pump intake means and pump discharge means, and valve means arranged to selectively discharge steam into the intake means and discharge means for removal of liquid and congealed water from said means.

16. In a system for increasing water content and modifying flow in natural watersheds and basins, a plurality of elongated treatment basins arranged in end-to-end relation and extending for a substantial distance along a valley floor in adjoining relation to a stream for freezing water therein during periods of sufficiently low ambient temperatures, the upper ends of said basins being lower but at approximately the same elevation as the portion of the stream adjacent thereto, the lower ends of said basins being substantially lower than the portion of the stream adjacent thereto and substantially lower than their upper ends, conduit means for directing water from the stream into the upper ends of said upper basins to congeal and form ice therein, conduit means for directing water from the stream into the upper ends of said lower basins to congeal and form ice therein, valve-controlled conduit means for selectively directing water from an upper basin by gravity flow into an abutting lower basin after general thawing begins, a flow regulating conduit for returning water in a gravity flow from a lower basin to the stream, and means including a pump for returning water in the lower levels of the lower basins to said stream.

17. In a system for increasing water content and modifying flow in natural watersheds and basins, a plurality of elongated treatment basins arranged in end-to-end relation and extending for a substantial distance along a valley floor in adjoining relation to a stream for freezing water therein during periods of sufficiently low ambient temperatures, the upper ends of said basins being lower but at approximately the same elevation as the portion of the stream adjacent thereto, the lower ends of said basins being substantially lower than the portion of the stream adjacent thereto and substantially lower than their upper ends, conduit means for directing water from the stream into the upper ends of said upper basins to congeal and form ice therein, conduit means for directing water from the stream into the upper ends of said lower basins to congeal and form ice therein, valve-controlled conduit means for selectively directing water from an upper basin by gravity flow into an abutting lower basin, a flow regulating conduit for returning water in a gravity flow from a lower basin to the stream, and conduit means for directing water in the retention area at a lower level than the flow regulating conduit into ground water recharge courses adjoining said lower basins.

18. The method for increasing water content and modifying flow in natural watersheds and basins, which comprises wetting a large surface storage area with water from an adjoining source of water supply to establish by sufficiently low ambient temperatures a base having a sub-surface frost depth on the order of several feet, withdrawing water from the supply source during periods when ambient temperatures are about 32° F. or lower, distributing the withdrawn water progressively over the frozen storage area in small increments so as to induce an ice build-up over substantially the entire storage area, wetting with water from said supply falling and fallen snow of the treatment area whenever ambient and base temperatures will congeal the wetted snow into additional ice build-up, continuing such build-up progressively throughout the low temperature season until general thawing occurs, and releasing water of the thawing ice build-up into ground water recharge courses.

19. The method for increasing water content and modifying flow in natural watersheds and basins, which comprises wetting a large surface storage area with water from an available source of water supply to establish by sufficiently low ambient temperatures a frozen base therein, withdrawing water from the supply source throughout the winter months during periods when ambient temperatures are about 32° F. or lower, distributing the withdrawn water progressively over the frozen storage area in small increments so as to induce an ice build-up over substantially the entire frozen area, wetting with water from said supply falling and fallen snow of the treatment area whenever ambient and base temperatures will congeal the wetted snow into additional ice build-up, continuing such build-up progressively throughout the low temperature season until general thawing occurs, confining water of the thawing ice build-up in a water-retention basin at least partially surrounding the ice build-up area during progression of the thawing and while evaporation losses at the basin are substantially less than at the location of a downstream user, and releasing the confined water during summer months into a course of flow for delivery to the downstream user in accordance with the downstream user's requirement.

20. The method for increasing water content and modifying flow in natural watersheds and basins, which comprises wetting a large surface storage area bordering a mountainside and a flowing stream with water from an available source of supply to establish by sufficiently low ambient temperatures a frozen base therein, withdrawing water from the supply source throughout the winter months during periods when ambient temperatures are about 32° or lower, distributing the withdrawn water progressively over the frozen storage area in small increments so as to induce an ice build-up over substantially the entire storage area, collecting run-off water from the mountainside during the winter months whenever melting occurs on the slopes, wetting with water from said supply falling and fallen snow of the treatment area whenever ambient and base temperatures will congeal the wetted snow and run-off water into additional ice build-up, continuing such build-up progressively throughout the low temperature season until general thrawing occurs, collecting more run-off water from the mountainside in the treatment area when general thawing occurs, congealing some of the collected run-off water by maintaining it in contact with the formed ice build-up therein while the adjoining stream is conducting run-off water from other sources, and discharging water so confined into the stream in a predetermined volume after the stream resumes normal flow.

21. The method for increasing water content and modifying flow in natural watersheds and basins, which comprises wetting a large surface storage area bordering a flowing stream with water from an available source of supply to establish by sufficiently low ambient temperatures a frozen base therein, withdrawing water from the supply source throughout the winter months during periods when ambient temperatures are about 32° or lower, distributing the withdrawn water progressively over the frozen storage area in small increments so as to induce an ice build-up over substantially the entire storage area, wetting with water from said supply falling and fallen snow of the treatment area whenever ambient and base temperatures will congeal the wetted snow into additional ice build-up, continuing such build-up progressively throughout the low-temperature season until general thawing occurs, retaining melting water of the ice build-up in the storage area while the adjoining stream is conducting run-off water from other sources, and discharging water so retained into the stream in a predetermined volume after the stream resumes normal flow.

22. The method for increasing water content and modifying flow in natural watersheds and basins, which comprises wetting an elongated, large surface storage area with water from an available source of water supply to establish by sufficiently low ambient temperatures a base having a sub-surface frost depth on the order of several feet, withdrawing water from the supply source during periods when ambient temperatures are about 32° F. or lower, spraying the withdrawn water sequentially in small increments at a plurality of locations along the length of the area in lapping segmental patterns, each extending across the width of the area so as to induce an ice build-up over substantially the entire storage area, spraying falling and fallen snow of the treatment area with water from said supply whenever ambient and base temperatures will congeal the wetted snow into additional ice build-up, continuing such build-up progressively through the low temperature season until general thawing occurs, and releasing water of the thawing ice build-up into a water course supplying downstream users.

23. The method for increasing water content and modifying flow in natural watersheds and basins, which comprises wetting an elongated, large surface storage area with water from an available source of water supply to establish by sufficiently low ambient temperatures a base having a sub-surface frost depth on the order of several feet, withdrawing water from the supply source during periods when ambient temperatures are about 32° F. or lower, spraying the withdrawn water sequentially in small increments at a plurality of locations along the length of the area in lapping circumferential patterns, each extending across the width of the area so as to induce an ice build-up over substantially the entire storage area, spraying falling and fallen snow of the treatment area with water from said supply whenever ambient and base temperatures will congeal the wetted snow into additional ice build-up, continuing such build-up progressively through the low temperature season until general thawing occurs, and releasing water of the thawing ice build-up into a water course supplying downstream users.

References Cited

UNITED STATES PATENTS

| | | | |
|---|---|---|---|
| 1,585,182 | 5/1926 | Blankenship | 61—1 X |
| 2,091,344 | 8/1937 | Waterfall. | |
| 2,455,234 | 11/1948 | Crick | 61—1 |
| 3,129,565 | 4/1964 | Bellamy | 61—1 |

FOREIGN PATENTS 150,317   1/1963   Russia.

EARL J. WITMER, *Primary Examiner.*